United States Patent [19]

Matsuzaki

[11] Patent Number: 5,078,635
[45] Date of Patent: Jan. 7, 1992

[54] METHOD OF MANUFACTURING MAGNETRON ANODES

[75] Inventor: Toshiyuki Matsuzaki, Yokohama, Japan

[73] Assignee: Kabushiki Kaisha Toshiba, Kawasaki, Japan

[21] Appl. No.: 563,619

[22] Filed: Aug. 7, 1990

[30] Foreign Application Priority Data

Sep. 11, 1989 [JP] Japan .................................. 1-234958

[51] Int. Cl.⁵ .................................. H01J 9/14
[52] U.S. Cl. .................................. 445/35; 228/179; 219/121.64
[58] Field of Search .................... 228/179; 219/121.63, 219/121.64; 445/35

[56] References Cited

U.S. PATENT DOCUMENTS 4,167,662 9/1979 Steen .............................. 219/121.64

FOREIGN PATENT DOCUMENTS 56-156646 12/1981 Japan .
2160630 12/1985 United Kingdom .

OTHER PUBLICATIONS

Matsuzaki Hikari, Magnetron Anode and Manufacture, Patent Abstracts of Japan, Mar. 6, 1982, vol. 6, No. 37 (E-097).

Primary Examiner—Kenneth J. Ramsey
Attorney, Agent, or Firm—Cushman, Darby & Cushman

[57] ABSTRACT

A method of manufacturing a magnetron anode. A plurality of anode vanes, having end faces to be welded, are radially arranged in an anode cylinder, and then laser beams are radiated from the outside of the cylinder, for welding the vanes and the cylinder such that 20-90% of the entire area of each of the end faces remains as an unmelted area.

4 Claims, 3 Drawing Sheets

METHOD OF MANUFACTURING MAGNETRON ANODES

BACKGROUND OF THE INVENTION

1. Field of the Invention

This invention relates to a method of manufacturing magnetron anodes.

2. Description of the Related Art

Conventional magnetron anodes for use in, for example, microwaves ovens, comprise an anode cylinder and a plurality of anode vanes radially extending in the anode cylinder, each adjacent pair defining a resonance cavity. Though these vanes can be made of Cu or Al, both of which are good electric and thermal conductors, they are generally made of Cu as it has high heat resistance.

In the conventional method of manufacturing such a magnetron anode, the anode vanes are united with an anode cylinder, by a solder mainly consisting of Ag, in a furnace filled with $H_2$ gas or a mixture of $H_2$ and $N_2$ gases. Thus, the method requires large equipment for soldering, which increases the cost. Further, a solder is needed for each anode vane, or an annular solder which contacts the inner periphery of the anode cylinder must be prepared. Hence, the resulting product is very expensive.

Moreover, in the method, the anode is assembled by using a jig before soldering, and then soldered in a furnace, together with the jig. To facilitate the assembling of the anode, clearances are provided between the jig and respective components of the anode. These clearances change as the components and the jig inevitably expand when the temperature in the furnace rises to about 800°-930° C. for soldering. Thus, the resulting product has an inner diameter defined by the anode vanes at the cathode side, and an angle defined by each adjacent pair of the vanes, both different from the design values. Consequently, the product cannot but have an oscillation frequency or oscillation mode which is far from stable.

Further, the specification of Japanese Patent Disclosure No. 56-156646 shows a method of welding a anode cylinder and anode vanes by radiating laser beams onto the anode cylinder from the outside. In this method, the anode vanes are secured to the anode cylinder, with their end faces completely melted. Therefore, the anode vanes must be fixed in position during welding, as in the above soldering method, in order to prevent changes in the inner diameter defined by the vanes at the cathode side, and in the angle between each adjacent pair of vanes.

SUMMARY OF THE INVENTION

It is an object of the invention to provide a method of manufacturing a magnetron anode which can enhance the assembling accuracy of the anode vanes and produce anodes of high quality.

To attain this object, the method of the invention comprises the steps of: radially arranging a plurality of anode vanes, having end faces, in an anode cylinder having an outer surface; and welding the anode vanes and anode cylinder together by radiating laser beams onto the outer surface of the anode cylinder from the outside of the cylinder, such that a portion of a predetermined area remains as an unmelted portion of each of the end faces of the anode vanes, the predetermined area falling within the range of from 20% to 90% of the entire area of each of the end faces.

Therefore, the method of the invention can fix the anode vanes in position, preventing changes in the inner diameter defined by the vanes at the cathode side and in the angle between each adjacent pair of vanes.

Additional objects and advantages of the invention will be set forth in the description which follows, and in part will be obvious from the description, or may be learned by practice of the invention. The objects and advantages of the invention may be realized and obtained by means of the instrumentalities and combinations particularly described in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
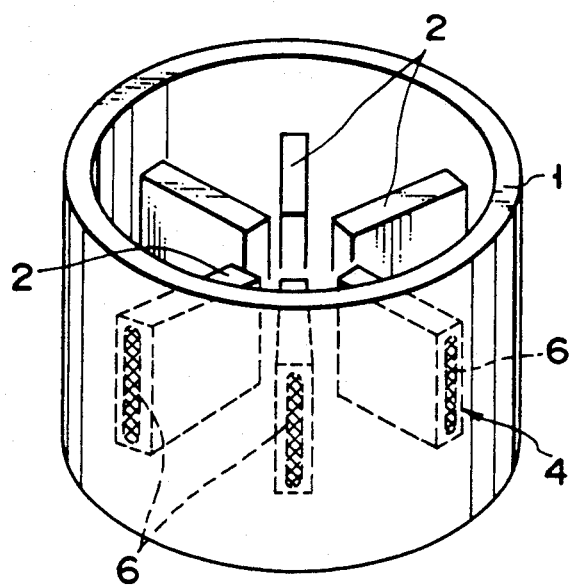
FIG. 1 is a perspective view of a magnetron anode, which is produced by a method according to an embodiment of the invention.
Figure 2:
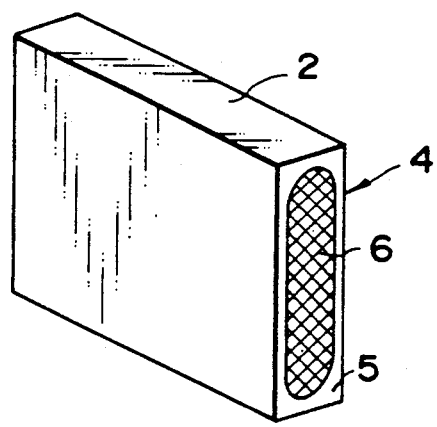
FIG. 2 is a perspective view of an anode vane employed in the magnetron anode shown in FIG. 1.

As is shown in FIG. 1, the magnetron anode produced by the method of the invention has an anode cylinder 1, and a plurality of plate-like anode vanes 2 radially extending in the anode cylinder 1. The vanes 2 each have an outer end face 4 secured to the inner surface of the cylinder 1 by laser-beam welding. FIG. 2 shows one of the vanes 2, in which reference numeral 5 designates the unmelted area, and numeral 6 designates the melt area. The unmelted area should be 20-90% of the entire area of the end face 4 and, accordingly, the remaining 80-10% thereof is the weld or melt area 6.

Figure 3:
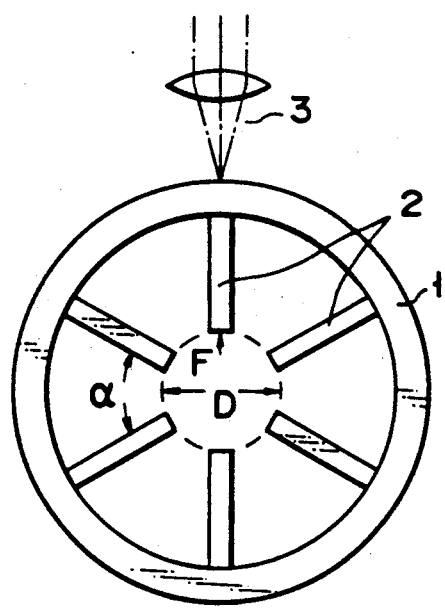
FIG. 3 is a plan view, useful in explaining the method of the invention.
Figure 4:
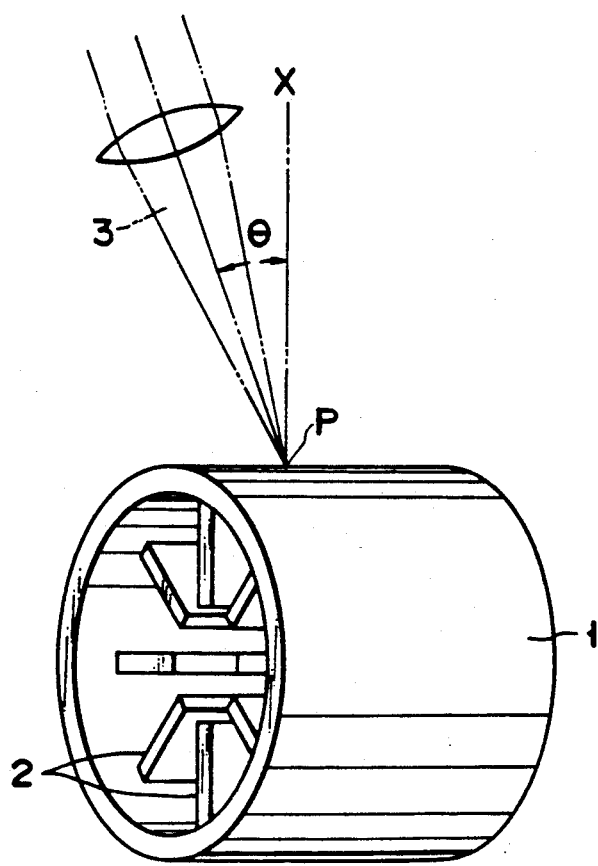
FIG. 4 is a perspective view, useful in explaining the method of the invention.

To manufacture the magnetron anode, a plurality of the anode vanes 2 are radially arranged in the anode cylinder 1, and then laser beams 3 are radiated onto the cylinder 1 from the outside, to weld the vanes 2 and the cylinder 1 together, as shown in FIGS. 3 and 4.

First, a positioning jig, not shown, is inserted in the anode cylinder 1, and then a predetermined number of anode vanes 2 are arranged in the same. Thereafter, the anode vanes 2 are urged outwards from the axis of the anode cylinder by the positioning gig against the inner surface of the anode cylinder 1, as is indicated by the arrow F shown in FIG. 3. Thus, the anodes are arranged such that the diameter D of the circle defined by the respective inner ends of the anode vanes 2, and the angle α defined by each adjacent pair of vanes 2 attain respective predetermined values. Then, as is shown in FIG. 4, the laser beams 3 are radiated at an angle onto the outer periphery of the anode cylinder 1. For example, they are radiated at an angle θ of about 20 degrees with respect to the perpendicular line X. This prevents the laser beams from being reflected from the anode cylinder surface to a laser oscillator, not shown, and hence the power of the laser can be accurately controlled. If the thicknesses of the anode cylinder 1 and the anode vane 2 are each set to 2.0 mm, the diameter of the focal area P of the laser beams 3 is set to 0.2 mm. In relation to this, when copper is used as the component of the members to be welded, carbon-dioxide-gas ($CO_2$) beams, which have a relatively long wavelength, are preferable as the laser beams 3.

Figure 5:
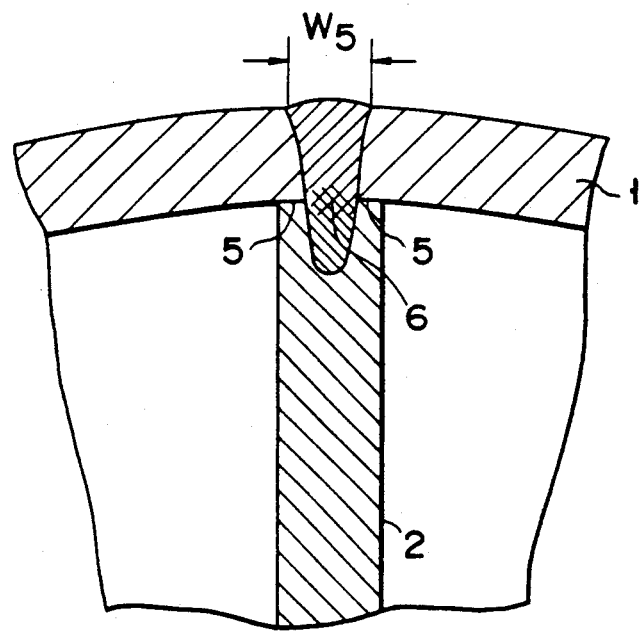
FIG. 5 is a partial sectional view of the anode cylinder and the anode vane to which the method of the invention is applied, showing a melted state thereof.
Figure 6:
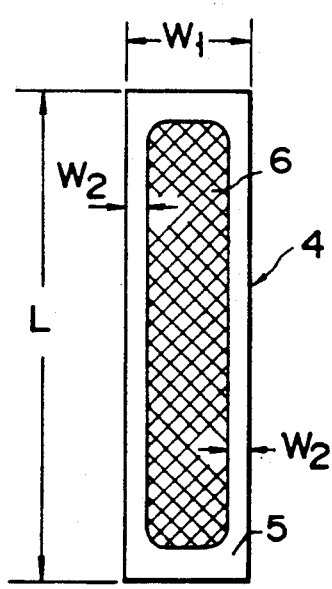
FIG. 6 is a plan view of the anode vane shown in FIG. 5, illustrating an example of an unmelted area thereof.

The transverse section of the weld is schematically shown in FIG. 5, wherein the melted area 6 extends from the outer peripheral surface of the anode cylinder 1 to the outer end of the anode vane 2, which area is stable physically and mechanically. To obtain desirable results, the width $W_5$ of the melted area 6 at the outer surface of the cylinder 1 should be set to 1.2–1.8 mm. Incidentally, the unmelted area 5 of the anode vane 2 should be in tight contact with the anode cylinder 1.

If the outer end face 4 of the vane 2 has a width $W_1$ of about 2.0 mm, and a length L of about 9.0 mm, the welding is performed such that the unmelted area 5, having a width $W_2$ of about 0.2 mm, is formed over the peripheral edge of the outer end face 4. Thus, the unmelted area 5 covers 20% of the entire area of the same, and is in mechanical contact with the anode cylinder 1.

Figure 7:
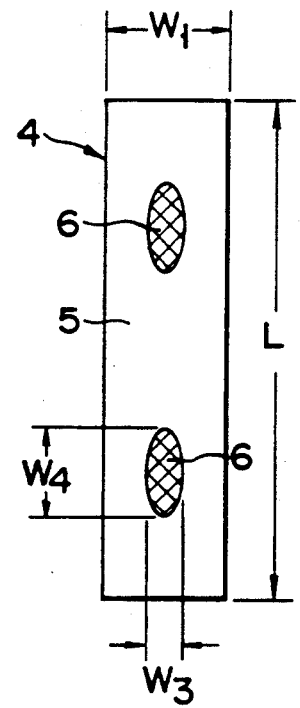
FIG. 7 is a plan view of the anode vane shown in FIG. 5, illustrating a variation of an unmelted area thereof.

FIG. 7 shows a variation in the welding, wherein two central portions 6 are welded, each of which has a smaller diameter $W_3$ of about 1 mm and a larger diameter $W_4$ of about 1.5 mm. In this case, the unmelted area 5 covers substantially 90% of the entire end face 4 of the vane 2. If the unmelted area covers more than 90%, satisfactory welding strength cannot be obtained, while if it covers less than 10%, the melted area 6 becomes too large to fix the vane 2 in position. Consequently, it is preferable to obtain an unmelted area of between 20–90% of the end face 4.

More specifically, if the end face 4 is wholly melted and secured to the cylinder I, the vane 2 is sunk in the cylinder 1, resulting in changes in the inner diameter D and/or the angle α, which are predetermined to desired values. To avoid this, the unmelted area 5 is provided in the invention.

Further, the method of the invention is carried out at room temperature, so that the clearances between the component parts and positioning jig do not change, which enhances the assembling accuracy.

Moreover, the method of the invention requires no inserts during welding, which can make the products much cheaper than the conventional ones manufactured by soldering.

Also no hydrogen furnaces or the like are required, resulting in a reduction in power cost and space for equipment.

What is claimed is:

1. A method of manufacturing a magnetron anode, comprising the steps of:
    arranging a plurality of anode vanes, each having end surfaces, inside an anode cylinder in such a manner that the anode vanes are pressed against an inner surface of the anode cylinder; and
    laser welding the anode vanes to the anode cylinder by irradiating a laser beam guided from a carbon-dioxide ($CO_2$) gas laser oscillator onto an outer surface of the anode cylinder, such that a peripheral portion of a to-be-welded end surface of each anode vane remains as an unmelted portion, and a center portion of the end surface is melted to be welded, the peripheral portion falling within a range from 20% to 90% of the entire area of the end surface of each anode vane.

2. The method according to claim 1, wherein the laser beams are radiated at an angle away from the perpendicular with respect to the outer surface of the anode cylinder.

3. A method of manufacturing a magnetron anode as in claim 1, in which the anode vanes and anode cylinder are made of copper.

4. A method of manufacturing a magnetron anode as in claim 1, in which the anode vanes and anode vanes and anode cylinder are made of aluminum.

* * * * *